(12) United States Patent
Madonna et al.

(10) Patent No.: US 9,191,230 B2
(45) Date of Patent: Nov. 17, 2015

(54) DOCKING STATION WITH REDUNDANT COMMUNICATION PATH

(75) Inventors: Robert P. Madonna, Osterville, MA (US); Michael E. Noonan, Sandwich, MA (US); Michael C. Silva, East Sandwich, MA (US)

(73) Assignee: Savant Systems, LLC, Hyannis, MA (US)

(*) Notice: Subject to any disclaimer, the term of this patent is extended or adjusted under 35 U.S.C. 154(b) by 312 days.

(21) Appl. No.: 13/113,215

(22) Filed: May 23, 2011

(65) Prior Publication Data

US 2011/0298736 A1    Dec. 8, 2011

Related U.S. Application Data

(60) Provisional application No. 61/351,085, filed on Jun. 3, 2010.

(51) Int. Cl.
*G06F 3/041* (2006.01)
*G06F 3/045* (2006.01)
(Continued)

(52) U.S. Cl.
CPC .......... *H04L 12/2809* (2013.01); *G06F 1/1632* (2013.01); *H04L 12/282* (2013.01); *H04L 2012/285* (2013.01); *H04L 2012/2841* (2013.01)

(58) Field of Classification Search
CPC .... G06F 3/041; G06F 3/01416; G06F 1/1632
See application file for complete search history.

(56) References Cited

U.S. PATENT DOCUMENTS

| 2002/0033760 A1 | 3/2002 | Kobayashi |
| 2007/0077784 A1 | 4/2007 | Kalayjian et al. |

(Continued)

FOREIGN PATENT DOCUMENTS

| JP | 2003-229790 A | 8/2003 |
| JP | 2006-324922 A | 11/2006 |

(Continued)

OTHER PUBLICATIONS

"Notification of Transmittal of the International Search Report and the Written Opinion of the International Searching Authority, or the Declaration," International Filing Date: Jun. 2, 2011, International Application No. PCT/US2011/000993, Applicant: Savant Systems, LLC, Date of Mailing: Aug. 10, 2011, pp. 1-14.

(Continued)

*Primary Examiner* — Alexander Eisen
*Assistant Examiner* — Nan-Ying Yang
(74) *Attorney, Agent, or Firm* — Cesari and McKenna, LLP; James A. Blanchette (57) ABSTRACT

A docking station adapted to receive a touch-sensitive portable control device for communication with a programmable multimedia controller is provided. The docking station has a dedicated, wired redundant communication path coupling the docking station to the programmable multimedia controller for providing effective communication in the absence of wireless or unreliable wireless communications. The docking station is configured to receive signals from the portable control device and to bi-directionally transmit signals to and from said programmable multimedia controller. The portable control device has both wireless and wired compatibility, which includes a touch sensitive user interface configured with configuration information for allowing a user to make selections and enter settings regarding components interfaced with the programmable multimedia controller. The docking station converts the user entered signals into IP messages suitable for transfer over the dedicated, wired redundant communication path.

19 Claims, 6 Drawing Sheets

(51) Int. Cl.
 *G01M 1/38* (2006.01)
 *G05B 13/00* (2006.01)
 *G05B 15/00* (2006.01)
 *G05D 23/00* (2006.01)
 *H04L 12/28* (2006.01)
 *G06F 1/16* (2006.01)

(56) References Cited

U.S. PATENT DOCUMENTS

| | | | |
|---|---|---|---|
| 2007/0086724 A1* | 4/2007 | Grady et al. | 386/46 |
| 2007/0142022 A1 | 6/2007 | Madonna et al. | |
| 2007/0143801 A1 | 6/2007 | Madonna et al. | |
| 2007/0225867 A1* | 9/2007 | Moorer et al. | 700/276 |
| 2008/0209479 A1 | 8/2008 | Zerr et al. | |
| 2008/0288702 A1* | 11/2008 | Diab et al. | 710/304 |
| 2009/0058361 A1* | 3/2009 | John | 320/128 |
| 2009/0237031 A1* | 9/2009 | Mcsweyn et al. | 320/114 |
| 2010/0069730 A1* | 3/2010 | Bergstrom et al. | 600/365 |
| 2010/0241254 A1 | 9/2010 | McKinley et al. | |
| 2010/0245668 A1 | 9/2010 | Hardacker et al. | |
| 2010/0250818 A1 | 9/2010 | Gill et al. | |
| 2010/0302168 A1* | 12/2010 | Giancarlo et al. | 345/169 |
| 2011/0124371 A1 | 5/2011 | Li et al. | |

FOREIGN PATENT DOCUMENTS

| | | | |
|---|---|---|---|
| RU | 53510 | 5/2006 | |
| WO | WO-01/22606 A1 | 3/2001 | |
| WO | WO-2006/083416 A2 | 8/2006 | |
| WO | WO-2007/075816 A2 | 7/2007 | |
| WO | WO-2008/070339 A2 | 6/2008 | |
| WO | WO-2008/073658 A2 | 6/2008 | |
| WO | WO 2008073658 A2 * | 6/2008 | H04L 12/28 |
| WO | WO-2009/012344 A2 | 1/2009 | |

OTHER PUBLICATIONS

Deng, Binwei, et al., "Design and Implementation of USB Bi-directional Communication in the Embedded Operating System," Modern Electronic Technology, second issue, 2005, pp. 78-80.

* cited by examiner

DOCKING STATION WITH REDUNDANT COMMUNICATION PATH

CROSS-REFERENCE TO RELATED APPLICATIONS

The present application claims the benefit of U.S. Provisional Patent Application Ser. No. 61/351,085, which was filed on Jun. 3, 2010, by Robert P. Madonna for a DOCKING STATION WITH REDUNDANT COMMUNICATION PATH and is hereby incorporated by reference.

BACKGROUND OF THE INVENTION

1. Field of the Invention

This invention relates generally to programmable multimedia control systems, and more particularly, to docking stations for user interface devices including touch sensitive portable control devices.

2. Background Information

A programmable multimedia controller (PMC) controls and/or manages a wide variety of audio, video, telecommunications, data communications or other devices with which the PMC is interfaced. As used herein, PMC and "programmable multimedia controller" are used interchangeably. The PMC with programmable services is based on a general purpose computer which controls a specialized embedded computer system. The general purpose computer may be matched with a second general purpose computer to provide redundancy. The multimedia controller includes a programming environment for creating services or user experiences that may incorporate features or functionalities of several devices that are conventionally operated as separate, standalone devices. Such services may range in complexity from simple control functions to multimedia experiences that combine high performance audio and video with the graphics capability of a general purpose computer, web-based services and telecommunications.

Services may be implemented according to various zones within a larger physical space. For example, a user may specify that certain services are available in the family room of a home, while different services are available in the kitchen, depending upon the components that are available in each room or user preferences. Services may also be implemented on a per user basis in conjunction with a user profile which specifies preferences, restrictions (e.g., parental controls) and the like.

The programming environment includes a library of component profiles. Component profiles may be implemented in a number of ways based upon desired attributes of the underlying data structures. In a preferred embodiment, a component profile is implemented as an Extensible Markup Language (XML) file which describes certain attributes of a component such as a DVD player, television, amplifier or any other type of component that is capable of interfacing with the system of the present invention. A component profile typically describes at least some of the physical characteristics of the component (e.g., the input/output connectors located on the back of the component), the configuration of the component (e.g., all possible types of modules that may be present in the slots or bays of a modular receiver), the set of commands that the component recognizes (e.g., power on, power off, open disk tray), as well as the functions that the component is capable of performing (e.g., play, pause, stop).

Use of XML files for component profiles, as well as other aspects of the programmable multimedia environment are discussed in commonly owned U.S. patent application Ser. No. 11/314,112 of Madonna, et al. for a PROGRAMMABLE MULTIMEDIA CONTROLLER WITH PROGRAMMABLE SERVICES, filed on Dec. 20, 2005, which is presently incorporated herein by reference.

As stated in the above referenced application, using a library of component profiles, a user can interactively describe how a particular installation is actually wired through an on-screen tutorial. In the case of a new installation, that system may make recommendations to the user as to how to wire an installation. Once wiring is established, a user can be advised about what services are available. A touch sensitive screen is generally the most ideal interface for tutorials and visuals of the components, as well as user-entered settings and selections.

From time to time, various touch sensitive portable communication and control devices come on the market. Several such devices are the Apple® iPad®, iPod® and iPod Touch®. These devices provide touch sensitive functionality for user selection and are themselves programmable. It would thus be beneficial to combine the functionality of such portable control devices with the PMC to provide control of the components of a programmable multimedia system. However, many such devices communicate wirelessly over wireless connections i.e., Wi-Fi, which connections can be unreliable or unavailable based upon low signal strength or interference. Additionally, wireless connections are often not secure.

SUMMARY OF THE INVENTION

These and other disadvantages are solved by the present invention in which an expandable multimedia control system is interfaced with a touch-sensitive portable control device that is coupled into the system. As used hereinafter, "touch-sensitive portable control device" and "portable control device" are used interchangeably. The touch sensitive portable control device is configured with an application that allows it to be compatible with the PMC to allow a user to make entries such as settings, selections and edits to the component profile for one or more of the components. Thus, a user can make entries directly on the touch screen of the portable control device. These entries may include such things as raising the volume on a surround sound audio system, or setting a temperature on a central air conditioning system.

In order to allow the touch sensitive portable control device to transmit such entries to the PMC, the touch sensitive control device is coupled to a docking station that is, in turn, coupled to the PMC.

In accordance with the invention, a dedicated, wired redundant communication path is created between the PMC and the touch sensitive portable communication device via the docking station. The wired, redundant connection path provides effective bi-directional communication between the PMC and the touch sensitive portable control device. In the absence of a wireless connection or in the case of an unreliable wireless connection, the wired connection of the present invention continues to transmit messages bi-directionally between the two devices. The wired communication path extends between a docking station and the PMC. The docking station is adapted to receive the portable control device in an appropriate input element such as a thirty pin connector. Then, the presence of the portable control device is detected by the docking station, then the docking station is ready to receive signals from the portable control device. These signals are user selection signals for changing settings on a component and/or for implementing other actions with respect to the components that are interfaced with the system.

The docking station is configured to convert the signals from the portable control device to IP control messages suitable for transmission over, illustratively, Ethernet, or other cable connection. The PMC then uses those signals to implement the user's entries. Thereafter, the PMC returns state information and meta data to the docking station, which in turn provides such information as an update to the portable control device.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
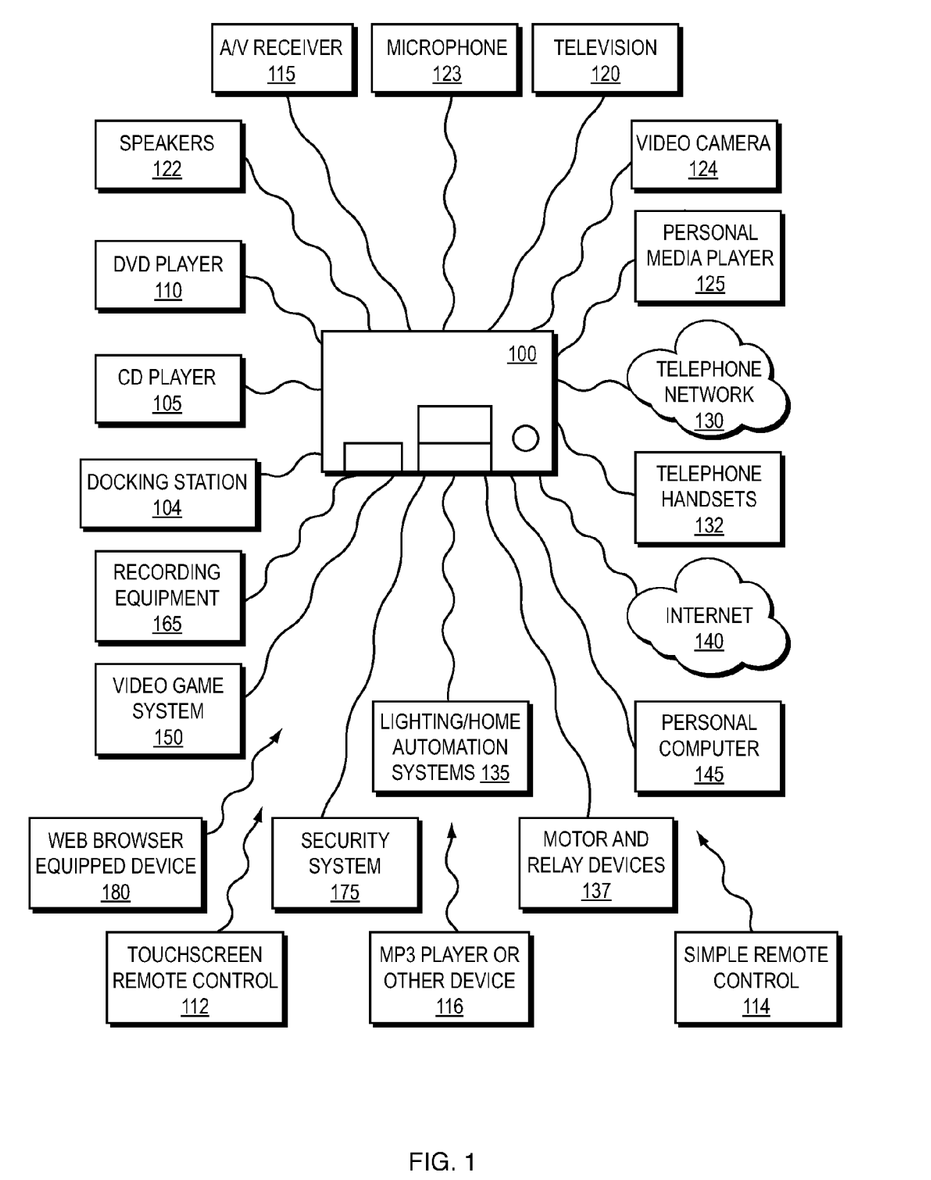
FIG. 1 is a programmable multimedia control system of an illustrative embodiment of the invention.

FIG. 1 is a block diagram of a PMC 100, interconnected to a number of devices, according to an illustrative embodiment of the present invention. The term "PMC" should be interpreted broadly as a device capable of controlling, switching data between, and/or interoperating with a variety of electronic devices, such as audio, video, telephony, data, security, motor-driven, relay-driven, and/or other types of electronic devices. By interacting with these devices the PMC may implement an integrated multimedia control solution.

In the illustrative embodiment, the PMC 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The PMC may also be connected to telephony devices such as a telephone network 130 and telephone handsets 132. The telephone network 130 may be a publicly switched telephone network (PSTN), an Integrated Services Digital Network (ISDN) or other communications network.

In addition, the PMC may intercommunicate with variety of light and/or home automation systems 135. These devices may operate via the X10 protocol developed by Pico Electronics, the INSTEON™ protocol developed by SmartHome, Inc, the CEBus standard managed by the CEBus Industry Council, or another well known home automation or control protocol. Similarly, the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected. Further, one or more remote control units 170 may be provided to manage the controller's functionality, and/or to control devices connected to the controller. Such remote control units may be interconnected to the controller via a wired network connection, an infra-red link, a radio-frequency link, a Bluetooth™ link, a ZigBee™ link or another appropriate data connection. As discussed more fully hereafter, a docking station 104 is interfaced with PMC 100.

Figure 2:
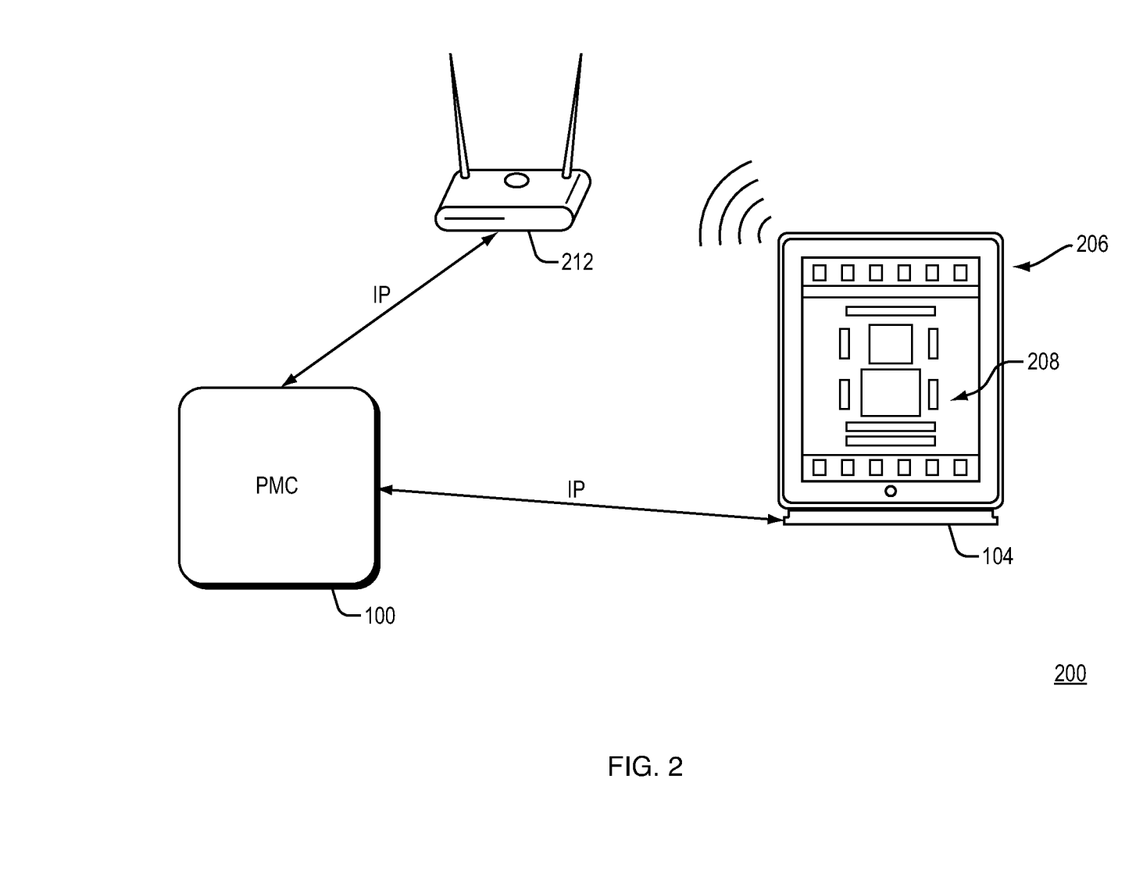
FIG. 2 is a schematic diagram of the PMC interfacing with the touch sensitive portable controller device in an illustrative embodiment of the present invention.

FIG. 2 illustrates the PMC 100 and the touch sensitive portable control device 206 in which an embodiment of the present invention may be employed. More specifically, system 200 includes a PMC 100, which as referenced above, is based on general purpose computer which controls a specialized embedded computer system. The PMC 100 provides services which may range in complexity from simple control functions to multimedia experiences that combine high performance audio and video with the graphics capability of a general purpose computer, web-based services and telecommunications for example. The PMC 100 is interfaced with a touch sensitive portable control device 206. The touch sensitive portable control device 206 has touch sensitive screen 208 that is housed in an outer frame 210. Using the screen 208, a user may enter commands and selections for controlling the components with which the system 100 is interfaced. For example, the user may control an audio or video system as well as a telephone system and a local computer LAN using the touchscreen 208. Additionally, household systems may be interfaced with the PMC such as a heating and air conditioning system, an alarm system, a lighting system and the like.

In prior systems, a touch sensitive panel issued commands and other signals wirelessly to a wireless router 212 as illustrated in FIG. 2. As noted earlier, the problem with wireless communication is that the wireless connection can become unavailable or unreliable. Thus, control is lost between the PMC 100 and the touch sensitive portable control device 206, which could result in a system wide inaccessibility because of the lack of a control connection.

Figure 3:
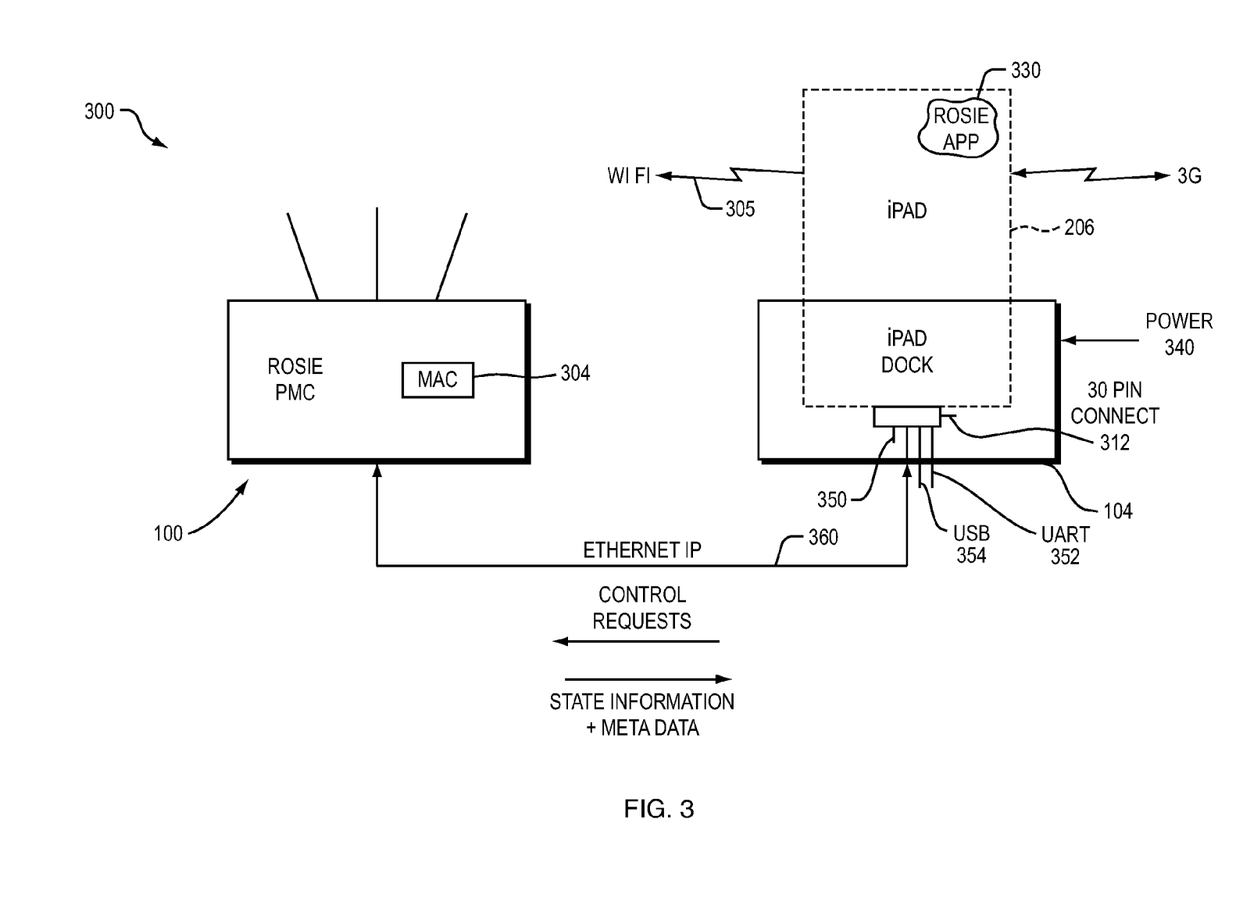
FIG. 3 is a schematic block diagram of the components and connections illustrating the wired redundant communication path in an illustrative embodiment of the present invention.

The present invention addresses this problem by the system illustrated in FIG. 3. As shown in FIG. 3, the system of the present invention includes a PMC 100, which as noted above, is based on a general purpose computer 304. As discussed earlier with respect to FIG. 2, the PMC 100 is interfaced with a number of components. The system of the present invention, also includes a touch sensitive portable control device 206, such as an Apple® iPad®. The iPad® has a screen that is touch sensitive and can be enabled to control the components that are interfaced with the PMC 100. In order to effectuate this control, the iPad® as used in the present invention, is configured with a software application 330 that is commercially available from Savant Systems, LLC of Hyannis Mass., USA. The software application 330 enables a user of the iPad® to enter selections, settings and commands regarding components that are interfaced with the system. The basic configuration of the Apple iPad® includes the iPad® interfacing with a 3G network. Additionally, the iPad® is configured to transmit and receive over Wi-Fi® which, as will be understood by those skilled in the art, is a wireless connection in a class of networks that are based upon the IEEE 802.11 standard.

In accordance with the present invention, the iPad® or any other similar device is received into the docking station 104 at an input connection. In the case of the iPad® and other Apple® devices, the input connection of docking station 104 is the 30 pin connector that receives a corresponding connector of Apple® product. The docking station 104 also has a power supply 340. The power supply provides power to the docking station 104, which in turn supplies power to the touch sensitive portable control device 206. The docking station power supply can also be used to recharge the battery in the touch sensitive control device 105. Additionally, the docking station has an accessory detect pin 350, which notifies the docking station whether the portable control device is interfaced with the docking station and docked appropriately. For communication between the portable control device and the docking station, there is a Universal Asynchronous (UART) pin 352, and a Universal Serial Bus (USB) pin 354.

In accordance with the invention, a wired, redundant communication path 360 is coupled between the docking station 104 and the PMC 100. In an illustrative embodiment the wired, redundant communication path 360 is provided as an Ethernet connection. As noted, the PMC 100 and the touch sensitive portable control device 206 also have wireless capabilities. Notably, in accordance with the invention, the wired, redundancy communication path 360 is effective for communication in the absence of the wireless link or in the case of an unreliable wireless link. Messaging between the docking station 104 and the PMC 100 occurs bi-directionally. More specifically, control requests are passed from the docking station 104 to the PMC 100. State information and meta data messages are returned from the PMC 100 to the docking station 104. In the specific example of the iPad®, the iPad® uses iAP® accessory protocol for messaging between the iPad and other devices in the system, such as the docking station.

Figure 4:
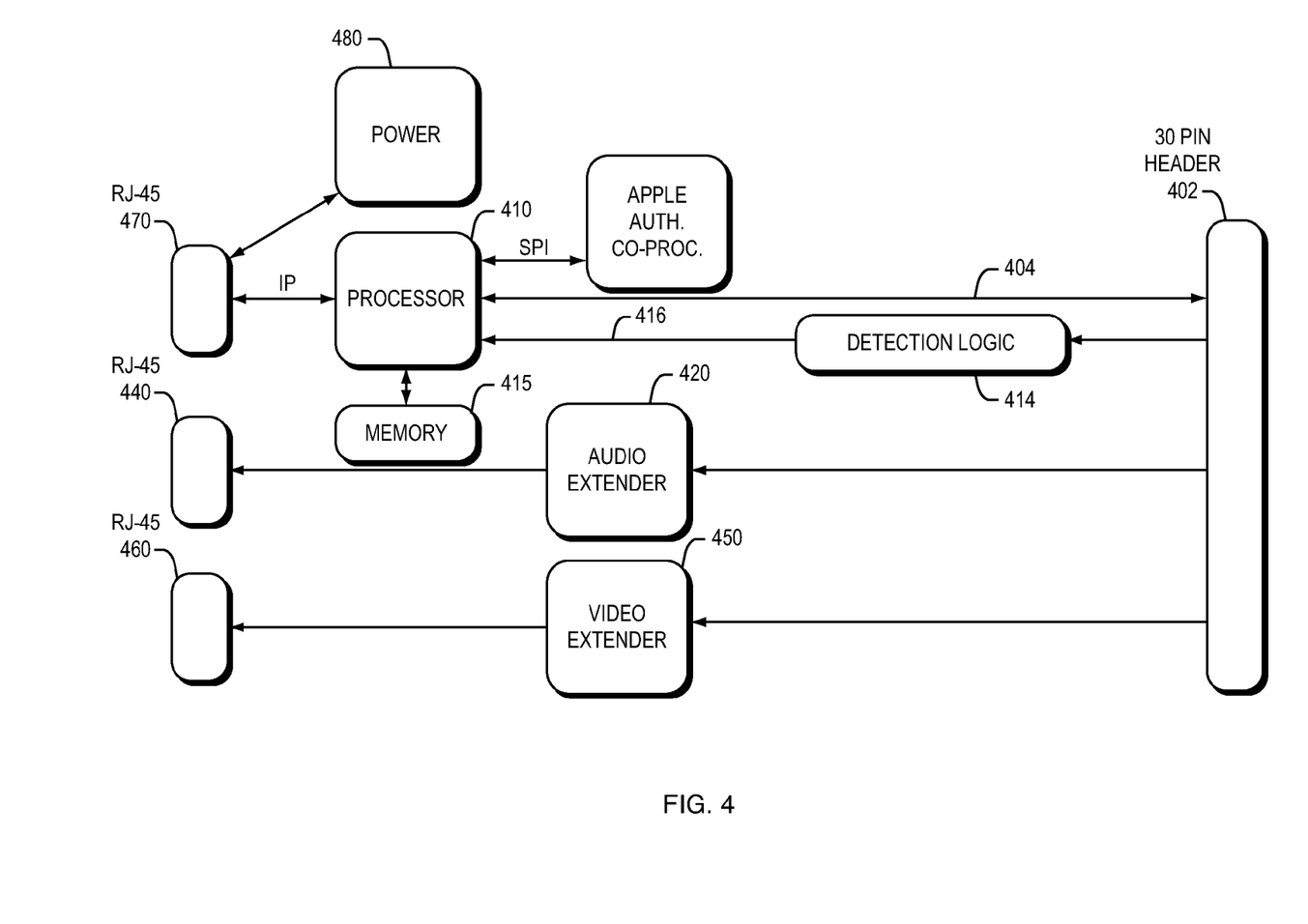
FIG. 4 is a schematic illustration of the processors and coupling devices of the docking station of the present invention.

FIG. 4 illustrates the circuitry and processors of the docking station 104. As noted, the docking station 104 has a 30 pin connector, so that it is adapted to receive a corresponding connector from the portable control device 206. In the docking station circuitry, there are communication paths for the UART and USB 404. This establishes a bi-directional path that transmits messages and signals from the touch sensitive control device 105 via the 30 pin header 402 of the docking station to the processor 410. The processor may be any suitable processor, such as an embedded processor.

Detection logic 414 is provided by the docking station 104 that notifies the docking station of the presence of the touch sensitive portable control device 206; this state is also transferred to the processor, as shown by the input 416, to notify the processor of the presence of the touch sensitive portable control device 206. The docking station 104 converts messages from the touch sensitive portable control device 206 to Internet Protocol (IP) suitable to be transmitted across the Ethernet connection, i.e., the wired, redundant communication path 360 of the present invention.

An audio extender 420 is coupled to an RJ-45 connector 440, which is compatible with an Ethernet connection. A video extender 450 is coupled to RJ-45 connector 460. Returning again to the processor, the processor 410 converts messages to Internet Protocol (IP), that are compatible with Ethernet, these messages are passed to the wired, redundant communication path 360 via the RJ-45 connector 470. Additionally, a power supply 480 provides power to the docking station 104, and to the touch sensitive control device 105. An Apple® authorized co-processor 490, provides appropriate signals to the processor 416. Thus, at the 30 pin header, user entered commands are received into the docking station. Audio signals are transmitted via audio extender 420, video signals are processed by video extender 450 and other information proceeds to the processor and then via the RJ-45 coupling to the PMC.

Figure 5:
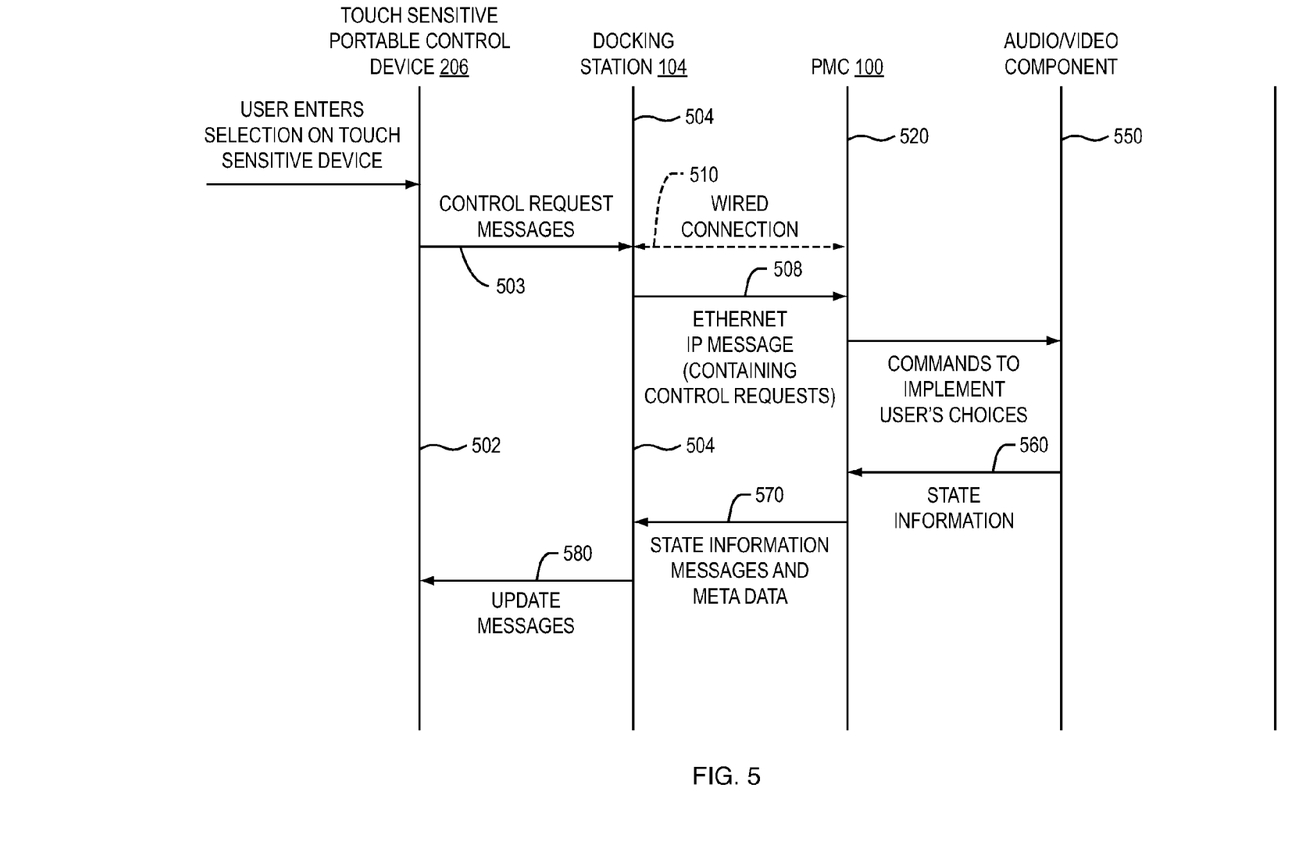
FIG. 5 is a messaging diagram concerning messaging between the docking station and the other components of the system.

Turning to FIG. 5, the figure illustrates a messaging diagram of the messages that are passed between various components of the present system. Beginning with the touch sensitive portable control device 206, this device 206 receives user entered selections regarding either commands, settings or controls for the various components with which the PMC 100 is interfaced. These user entered selections are converted into control request messages 503. These control request messages are sent through the 30 pin connector of FIG. 4 to the docking station.

The docking station 104 then converts these messages into Ethernet IP messages (containing the control requests). The Ethernet IP messages 508 are transmitted by the docking station 104 over the wired, redundant communication path 360 (FIG. 3) of the present invention, as well as wirelessly (not shown). The PMC 100 then converts these messages into commands that implement the user's choices such as the selections, commands and settings that may related to the operation of a component or to configure a component. These commands are sent to the respective components (FIG. 1). Thus, for example, a user may make an entry on the touch screen 208 of the touch sensitive portable control device 206 in order to increase the volume in an audio surround sound system, or the user may operate a household system, such as an alarm. Notably, the communications ports are bidirectional and independent traffic can flow in both directions simultaneously.

Figure 6:
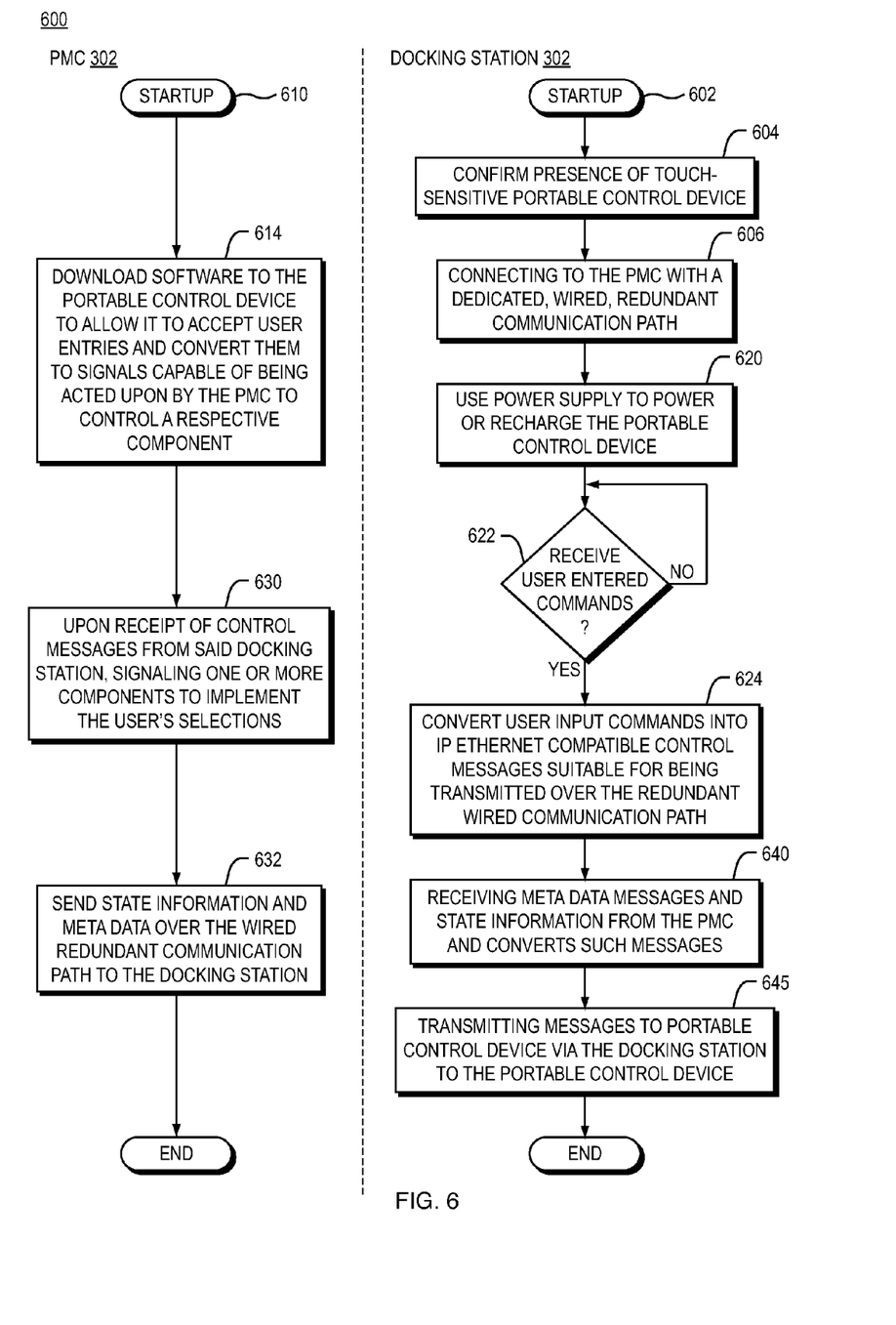
FIG. 6 forms a flow chart of a procedure with respect to an illustrative embodiment of the present invention.

The flow chart 600 of FIG. 6 illustrates a procedure whereby the docking station 104 interfaces between the portable control device 206 and the PMC 100. The procedure begins at the docking station at the startup 602 and proceeds to step 604. In accordance with step 604 the docking station 104 confirms the presence of the touch sensitive portable control device 206. The presence of the portable control device 206 is indicated by the accessory detection pin 350 (FIG. 3). At step 606, the docking station connects to the PMC 100 with a dedicated wired redundant path. Moving to the PMC 302 side of the flow chart 600, the procedure begins at step 610 and proceeds to step 614 in which the PMC downloads configuration data to the portable control device to allow the portable control device 206 to accept user entries and to convert them into signals capable of being acted upon by the PMC to control a respective component. At this point both the PMC 100 and the docking station 104 are coupled together with the dedicated wired is redundant communication path 360 and both are ready to receive and transmit signals bi-directionally across the dedicated wired redundant communication path. Turning to step 620, on the docking station side, in accordance with that step, the docking station 104 uses its own power supply to power or recharge the portable control device 206. The next step is an inquiry step which checks whether user entered commands have been received from the portable communication device to the docking station. If the answer is yes, then those signals are transferred to the docking station via the 30 pin connector illustrated in FIG. 3. As illustrated in step 624 the docking station converts user input commands into IP control messages that are suitable for being transmitted over the Ethernet-based wired, redundant communication path. On the PMC side, in accordance with step 630, upon receipt of such control message from the docking station, the PMC signals one or more components to implement the user's selections. After this is complete, the PMC 100, in accordance with step 632 sends state information and metadata over the wired, redundant communication path 360 to the docking station 104. The docking station receives the metadata messages and state information from the PMC 100 and converts such messages into a format that is readable by the portable control device. The procedure continues to step 645 in which messages are transmitted to the touch sensitive portable control device 206 via the docking station 104 from the PMC 100.

It should be understood that the present invention provides a wired, redundant communication path that is uninterrupted while a wireless connection is unavailable or unreliable. The wired connection is also more secure than a wireless connection.

The foregoing description has been directed to specific embodiments of this invention. It will be apparent, however, that other variations and modifications may be made to the described embodiments, with the attainment of some or all of their advantages. The procedures or processor may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A multimedia control system, comprising:
    a programmable multimedia controller being configured for controlling, switching data among and interoperating with associated components, including one or more of audio, video, telephony, data, security, motor-driven, or relay driven components, so as to provide one or more programmable services;
    a portable control device having a touch sensitive user interface configured with configuration information for allowing a user to make selections that are converted into control requests, said portable control device including a connector for sending the control requests via wired communication and having wireless capabilities for transmitting said control requests with a wireless connection;
    a docking station configured to couple said portable control device to said programmable multimedia controller, said docking station including detection logic that detects when said connector of said portable control device is connected to said docking station, and in response thereto causes a processor of said docking station to convert any control requests received from said portable control device into Internet Protocol (IP) messages for wired transmission to said programmable multimedia controller and any state information received from said programmable multimedia controller regarding implementation of said user selections received into update messages readable by the portable control device; and
    a wired redundant communication path extending between said docking station and said programmable multimedia controller, and being configured to transmit the IP messages between the docking station and said programmable multimedia controller,
    wherein said portable control device is configured to send control requests to said programmable multimedia controller via the wireless connection, when not coupled to the docking station, and to pass control requests to the docking station for conversion into IP messages and transmission over said wired redundant communication path to said programmable multimedia controller, when coupled to the docking station, such that at least some of the control requests are sent via the wireless connection and at least some of the control requests are sent as IP messages via said wired redundant communication path, and
    wherein said programmable multimedia controller is configured to send update messages including state information regarding implementation of said user selections to said portable control device via the wireless connection, when the portable control device is not coupled to the docking station, and to send IP messages to the docking station for conversion into update messages and transmission to said portable control device, when said portable control device is coupled to the docking station, such that at least some of the update messages are sent via the wireless connection and at least some of the update messages are sent as IP messages via said wired redundant communication path.

2. The multimedia control system as defined in claim 1, wherein said docking station is configured to receive said portable control device with a connector of said docking station.

3. The multimedia controller as defined in claim 1, wherein said connector of said docking station includes a thirty pin connector for receiving the portable control device.

4. The multimedia control system as defined in claim 1, wherein said wired redundant communication path includes an Ethernet connection.

5. The multimedia control system as defined in claim 4, wherein said IP messages transmitted from said docking station to said programmable multimedia control system over said Ethernet connection contain said control requests representing said user selections.

6. The multimedia control system as defined in claim 1, wherein said portable control device includes a touch sensitive user interface screen that provides said touch sensitive user interface.

7. The multimedia control system as defined in claim 6, wherein said portable control device is configured with configuration information allowing the touch sensitive user interface screen of the portable control device to interface with and to generate signals that are usable by the programmable multimedia controller to signal one or more components providing said one or more programmable services.

8. The multimedia control system as defined in claim 7, wherein said configuration information includes button locations, button functionality and touch screens associated with said one or more components.

9. The multimedia control system as defined in claim 7, wherein said configuration information includes one or more of graphics files, artwork, and image elements, which may be displayed as part of said touch sensitive user interface to allow said user to control one or more components that provide one or more programmable services.

10. The multimedia control system as defined in claim 1, wherein said portable control device has wireless capabilities that include Wi-Fi capabilities.

11. A method of communicating between a programmable multimedia controller and a portable control device, comprising:
    downloading software configuration information to said portable control device allowing it to accept user selections on a user interface screen of the portable control device with respect to a component interfaced with the programmable multimedia controller;
    providing a docking station that receives the portable control device and accepts control requests from a connector of the portable control device, the docking station configured to detect when said portable control device is connected to said docking station;
    connecting the docking station to the programmable multimedia controller with a wired redundant communication path;
    receiving, at the programmable multimedia controller, at least some of the control requests via a wireless connection between said portable control device and said programmable multimedia controller and at least some of the control requests received as Internet Protocol (IP) messages via the wired redundant communication path between said docking station and said programmable multimedia controller, and sending commands to one or more respective components implementing user selections; and providing, by the programmable multimedia controller, update messages including state information regarding implementation of said user selections in a redundant manner over both the wireless connection between said portable control device and said programmable multimedia controller and as IP messages over the wired redundant communication path between said docking station and said programmable multimedia controller.

12. The method as defined in claim 11, further comprising: configuring said portable control device to receive user selections via a touch sensitive user interface screen.

13. A multimedia control system, comprising:
a portable control device having a touch sensitive screen;
a programmable multimedia controller coupled to a plurality of components, the programmable multimedia controller configured to download configuration data to the portable control device to configure the portable control device to accept user entries via the touch sensitive screen that indicate desired changes to one or more settings of the components; and
a docking station used to communicate between the programmable multimedia controller and the portable control device, the docking station including:
a header configured to receive a connector of the portable control device having the touch sensitive screen when the portable control device is docked to the docking station,
a first port coupled to a first Ethernet communication path that extends between the docking station and the programmable multimedia controller,
detection logic coupled to the header and configured to detect when the connector of the portable control device is connected to the docking station, and in response thereto provide a notification, and
a processor coupled to the detection logic and configured to, in response to the notification from the detection logic, convert control requests that embody the user entries that indicate desired changes to the one or more settings for the components coupled to the programmable multimedia controller and that are received from the portable control device, via the header, into corresponding Internet Protocol (IP) messages, and convert state information in IP messages regarding implementation of said user entries by components coupled to the programmable multimedia controller and that are received from the programmable multimedia controller, via the first port, into corresponding update messages,
wherein the processor is configured to transmit the IP messages corresponding to control requests, via the first Ethernet communication path, to the programmable multimedia controller, to supplement control requests sent via an unavailable or unreliable wireless connection of the portable control device, and to pass the update messages corresponding to IP messages, via the header, to the portable control device, to supplement update messages sent via the unavailable or unreliable wireless connection of the portable control device.

14. The multimedia control system of claim 13, wherein the docking station further includes:
a second port coupled to a second Ethernet communication path that extends between the docking station and the programmable multimedia controller; and
an audio extender configured to pass audio received from the portable control device to the programmable multimedia controller via the second Ethernet communication path.

15. The multimedia control system of claim 13, wherein the docking station further includes:
a third port coupled to a third Ethernet communication path that extends between the docking station and the programmable multimedia controller; and
a video extender configured to pass video received from the portable control device to the programmable multimedia controller via the third Ethernet communication path.

16. The multimedia control system of claim 13, wherein the docking station further includes:
a power supply coupled to the first port, the power supply to use received power to power components of the docking station and to recharge the portable control device when connected to the docking station.

17. A method of communicating between a programmable multimedia controller coupled to a plurality of components and a portable control device having a touch sensitive screen, comprising:
downloading configuration data from the programmable multimedia controller to the portable control device to configure the portable control device to accept user entries via the touch sensitive screen that indicate desired changes to one or more settings of the components coupled to the programmable multimedia controller;
receiving a connector of the portable control device in a docking station;
detecting, by the docking station, when the connector of the portable control device is connected to the docking station, and in response thereto providing a notification;
in response to the notification, converting, by the docking station, control requests received from the portable control device that embody the user entries that indicate desired changes to the one or more settings for the components coupled to the programmable multimedia controller into corresponding Internet Protocol (IP) messages, and converting, by the docking station, state information in IP messages received from the programmable multimedia controller regarding implementation of said user entries by the components coupled to the programmable multimedia controller into corresponding update messages readable by the portable control device;
transmitting the IP messages corresponding to control requests, via a first Ethernet communication path, to the programmable multimedia controller, to supplement control requests sent via an unavailable or unreliable wireless connection of the portable control device; and
passing the update messages corresponding to IP messages to the portable control device, to supplement update messages sent via the unavailable or unreliable wireless connection of the portable control device.

18. The method of claim 17, further comprising:
receiving audio from the portable control device at the docking station; and
passing, by the docking station, the audio received from the portable control device to the programmable multimedia controller via a second Ethernet communication path.

19. The docking station of claim 17, further comprising:
receiving video from the portable control device at the docking station; and
passing video received from the portable control device to the programmable multimedia controller via a third Ethernet communication path.

\* \* \* \* \*

UNITED STATES PATENT AND TRADEMARK OFFICE
CERTIFICATE OF CORRECTION

| | | |
|---|---|---|
| PATENT NO. | : 9,191,230 B2 | Page 1 of 1 |
| APPLICATION NO. | : 13/113215 | |
| DATED | : November 17, 2015 | |
| INVENTOR(S) | : Robert P. Madonna et al. | |

It is certified that error appears in the above-identified patent and that said Letters Patent is hereby corrected as shown below:

In the Specification:

Col. 6, line 43 should read:
together with the dedicated wired redundant communica- Signed and Sealed this
Tenth Day of May, 2016

Michelle K. Lee
*Director of the United States Patent and Trademark Office*